United States Patent [19]

Oshidari et al.

[11] Patent Number: 4,840,261
[45] Date of Patent: Jun. 20, 1989

[54] AUTOMATIC TRANSMISSION HAVING CENTRIFUGALLY OPERABLE DRAIN VALVE IN HYDRAULICALLY OPERATED CLUTCH ACTUATOR

[75] Inventors: Toshikazu Oshidari, Yokosuka; Noboru Hattori, Miura; Yoshiaki Kato, Fujisawa, all of Japan

[73] Assignee: Nissan Motor Co., Ltd., Yokohama, Japan

[21] Appl. No.: 127,253

[22] Filed: Dec. 1, 1987

[30] Foreign Application Priority Data

Dec. 4, 1986 [JP] Japan .................. 61-287628

[51] Int. Cl.⁴ ............................................. F16D 25/12
[52] U.S. Cl. ........................... 192/106 F; 192/85 AA; 91/442
[58] Field of Search .......... 192/106 F, 85 A, 85 AA, 192/85 AB, 85 AT, 85 F; 91/442, 452

[56] References Cited

U.S. PATENT DOCUMENTS

| | | | |
|---|---|---|---|
| 2,740,512 | 4/1956 | Fischer | 192/106 F |
| 3,378,111 | 4/1968 | Greer et al. | 192/85 AA |
| 3,647,037 | 3/1972 | Toma | 192/106 F |
| 3,724,626 | 4/1973 | Claus, Jr. et al. | 192/85 A |
| 4,509,627 | 4/1985 | Kawamoto | 192/106 F |

FOREIGN PATENT DOCUMENTS

54-103940  8/1979  Japan .
60-157520  8/1985  Japan .

Primary Examiner—Leslie A. Braun
Assistant Examiner—David A. Testardi
Attorney, Agent, or Firm—Foley & Lardner, Schwartz, Jeffery, Schwaab, Mack, Blumenthal & Evans

[57] ABSTRACT

A hydraulic actuator for hydraulically actuating a clutch mechanism to selectively engage a clutch drum and a planetary gear unit of an automatic transmission is disclosed, which comprises a chamber defined by the clutch drum; a piston operatively disposed in the chamber to form a fluid work chamber; a drain valve including a drain bore formed in the piston having one end exposed to the fluid work chamber and a valve ball movably disposed in the drain bore in such a manner that when the fluid work chamber is filled with a pressurized fluid, the ball closes the drain bore; and a flow straightening structure exposed to the fluid work chamber and formed on at least one of the piston and a bottom of the fluid work chamber in order to suppress formation of vortex flow near a mouth of the drain bore.

7 Claims, 8 Drawing Sheets

AUTOMATIC TRANSMISSION HAVING CENTRIFUGALLY OPERABLE DRAIN VALVE IN HYDRAULICALLY OPERATED CLUTCH ACTUATOR

BACKGROUND OF THE INVENTION

1. Field of the Invention

The present invention relates in general to automatic transmissions, and more particularly to automatic transmissions of a type which comprises a clutch drum, a planetary gear unit and a friction mechanism which, when actuated, engages the clutch drum with an internal gear of the planetary gear unit, and a hydraulic actuator for actuating the friction mechanism. More specifically, the present invention is concerned with hydraulic actuators of a type which has a centrifugally operable drain valve in order to drain, when the hydraulic actuator assumes its inoperative condition, a remaining fluid in a fluid work chamber of the actuator thereby eliminating a centrifugal force caused by the remaining fluid.

2. Description of the Prior Art

In an automatic transmission, friction mechanisms are used which are selectively actuated by hydraulic actuators for obtaining desired speed gear ratios. That is, by hydraulically operating the friction mechanisms, automatic shift from one speed gear ratio to another speed gear ratio is achieved. This means that during operation of the transmission, at least one of the hydraulic actuators is forced to rotate even when it is in its inoperative condition wherein no hydraulic pressure is applied to its associated fluid work chamber. However, as is known, due to rotation of the hydraulic actuator, a non-negligible centrifugal force is produced, which is caused by a remaining fluid in the fluid work chamber. This force sometimes stimulates the actuator to operate, but loosely, the friction mechanism bringing about an undesirable draggling phenomenon of the friction mechanism (viz., incomplete loosed engagement thereof) thereby deteriorating a normal operation of the transmission.

In order to solve this undesirable phenomenon, a drain valve is usually employed, which functions to drain or discharge the centrifugal pressure. One of the transmissions of the type using the drain valve is shown in FIG. 14.

Figure 14:
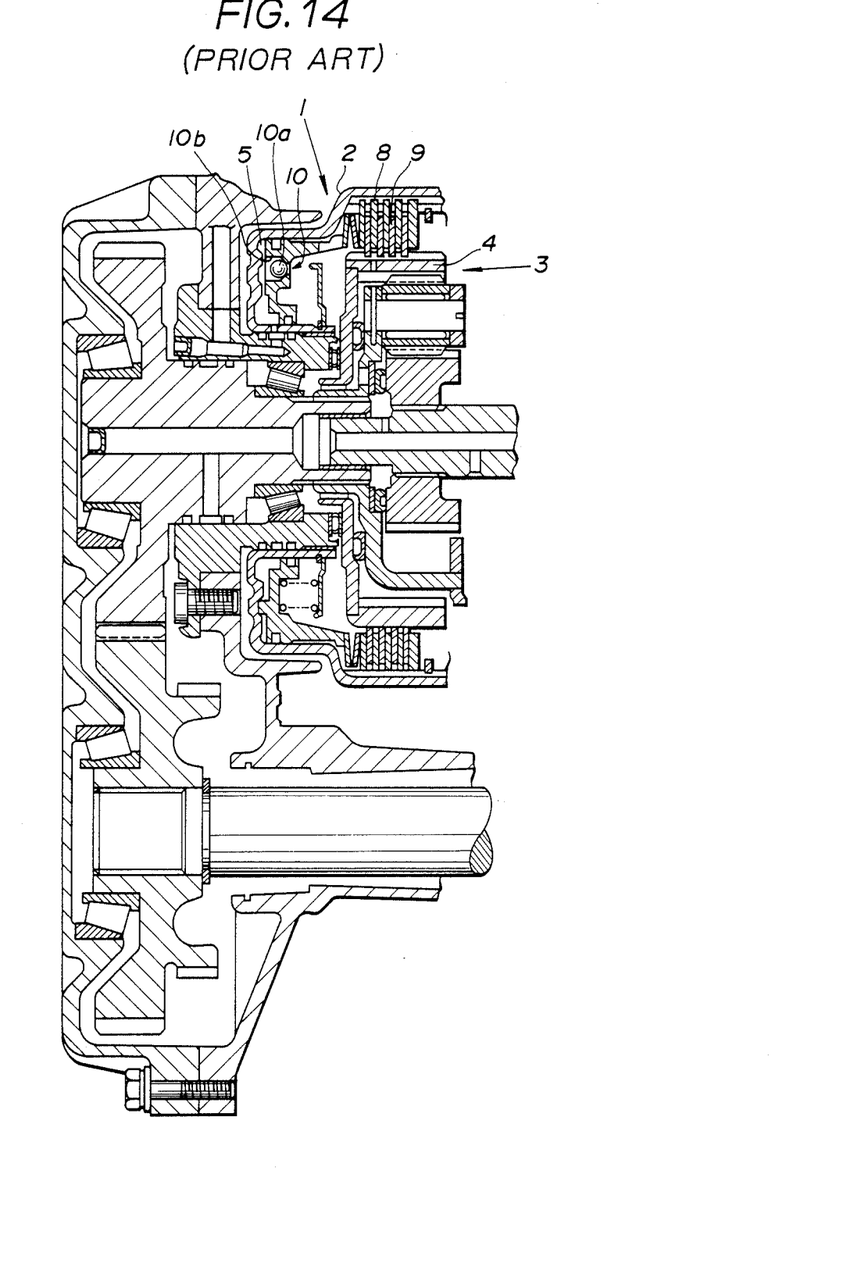
FIG. 14 is a sectional view of a part of the conventional automatic transmission which has been described hereinafore.

Referring to FIG. 14, there is shown a part of the transmission where a low clutch is arranged. Designated by numeral 1 is the low clutch which functions to selectively engage a clutch drum 2 with an internal gear 4. The clutch drum 2 is rotated together with a carrier of a front planetary gear unit (not shown), and the internal gear 4 is a part of a rear planetary gear unit 3. Upon application of fluid pressure to a fluid work chamber 5, a piston 6 is moved rightward in the drawing against a return spring 7 thereby to cause frictional engagement between clutch plates 8 and 9. With this, the clutch drum 2 is engaged with the rear planetary gear unit 3 to rotate therewith.

A drain valve 10 is associated with the piston 6, which comprises a valve ball 10a movably received in a restricted drain bore 10b formed in the piston 6. During rotation of the clutch drum 2 with the fluid work chamber 5 filled with a pressurized fluid, not only a certain fluid pressure but also a centrifugal force caused by the fluid in the chamber 5 is applied to the ball 10a.

Thus, under operation of the low speed clutch 1 wherein a certain fluid pressure is applied to the fluid work chamber 5, the ball 10a is forced to assume its close position by the force of the fluid, overcoming the centrifugal force inevitably applied thereto. Thus, under this condition, the operation of the low clutch 1 is not disturbed.

Under rest of the low clutch 1 wherein the clutch drum 2 is rotated with the fluid work chamber 5 supplied with "no" hydraulic pressure, the ball 10a is forced to assume its open position due to a centrifugal force produced by itself. Accordingly, even if any centrifugal force is generated in the fluid work chamber 5 due to presence of remaining fluid therein, the fluid is instantly drained through the drain bore 10b liminating or at least minimizing the centrifugal force caused by it. This prevents the undesired draggling phenomenon of the friction mechanism.

However, due to its inherent construction, the transmission of the above-mentioned type still has a following drawback which originates from the "Coriolis force".

Figure 15A:
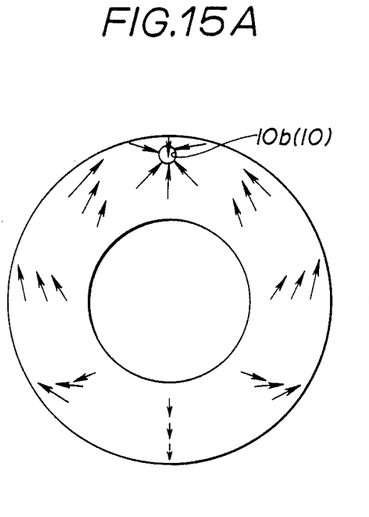
FIG. 15A is a schematically illustrated front view of a clutch piston of the conventional automatic transmission, showing the flowing directions of fluid when the clutch is not rotated.
Figure 16A:
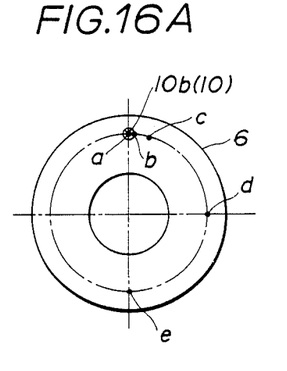
FIG. 16 a schematically illustrated front view of the clutch piston, showing selected five portions at which pressures are measured.

That is, when the low clutch 1 (more specifically, the piston 6) is not rotated, the flow of the fluid is not applied with the Coriolis force, so that the flow is smoothly directed toward the drain bore 10b of the drain valve 10 in a manner as indicated by arrows in FIG. 15A. Thus, in this case, there is produced no vortex flows about a mouth of the drain bore 10b. Accordingly, under this condition, the pressures created at portions "a", "b", "c", "d" and "e" (see FIG. 16A) in the fluid work chamber 5 are substantially equal as is depicted by a solid line of a graph of FIG. 16B. This means that in the fluid work chamber 5 there is no portions where a great pressure drop is generated.

Figure 15B:
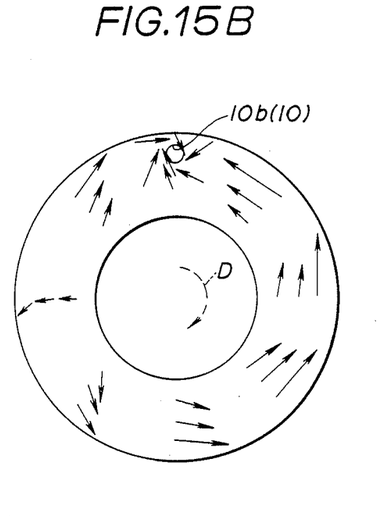
FIG. 15B is a view similar to FIG. 15A, but showing the flowing directions of the fluid when the clutch is not rotated.
Figure 16B:
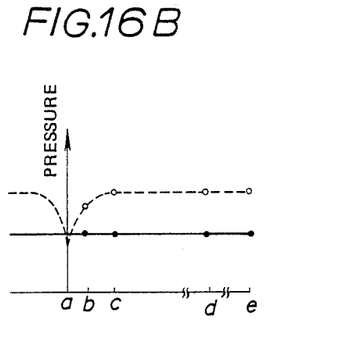

However, as is seen from FIG. 15B, when the low clutch 1 (viz., the piston 6) is rotated, the flow of the fluid is applied with the Coriolis force, so that the flow is directed toward the drain bore 10b in a manner as indicated by arrows in the drawing. Thus, in this case, there are produced vortex flows about the mouth of the drain bore 10b. (It is to be noted that the arrows designated by reference "D" is the direction in which the piston 6 is rotated.) The pressures at the portions "a", "b", "c", "d" and "e" in the fluid work chamber 5 are depicted in the graph of FIG. 16B by a broken line. As is seen from this graph, there is produced a great pressure drop at the mouth of the drain bore 10b, which is caused by the vortex flow.

Creation of such great pressure drop disturbs a smooth draining of the fluid through the drain bore 10b, so that elimination of the undesired centrifugal force is not effectively achieved. Furthermore, the creation of such great pressure drop causes increase in a critical pressure of fluid at which the drain valve 10 changes its open and close conditions, so that undesired function delay of the low clutch 1 may occur at the time when the fluid work chamber 5 is supplied with the pressurized fluid.

These phenomena bring about not only uncomfortable speed reduction feeling but also speed change lag.

SUMMARY OF THE INVENTION

It is therefore an object of the present invention to provide an automatic transmission which is free of the above-mentioned drawbacks.

According to the present invention, there is provided an improved automatic transmission wherein a straightening means is arranged in the fluid work chamber beside the drain bore of the drain valve for suppressing the undesired pressure drop at the same.

According to the present invention, there is provided, in an automatic transmission having a clutch drum, a planetary gear unit and a clutch mechanism which selectively engages the clutch drum and the planetary gear unit, a hydraulic actuator for actuating the clutch mechanism by using a hydraulic pressure. The hydraulic actuator comprises a chamber defined by the clutch drum; a piston operatively disposed in the chamber to form a fluid work chamber, the piston actuating the clutch mechanism when the fluid work chamber is filled with a pressurized fluid; a drain valve including a drain bore formed in the piston having one end exposed to the fluid work chamber and a valve ball movably interposed in the drain bore in such a manner that when the fluid work chamber is filled with a pressurized fluid, the ball closes the drain chamber; and flow straightening means for straightening flow of the fluid toward the drain bore in order to suppress formation of vortex flow of the fluid in the fluid work chamber.

BRIEF DESCRIPTION OF THE DRAWINGS

FIG. 16 is a graph plotting the pressures created at the selected portions.

DETAILED DESCRIPTION OF THE INVENTION

Figure 1A:
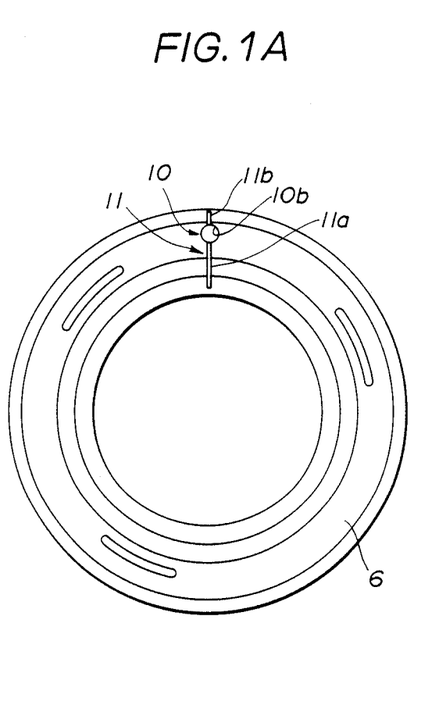
FIGS. 1A and 1B are respectively front and sectional views of a clutch piston, showing a first embodiment of the present invention.
Figure 1B:
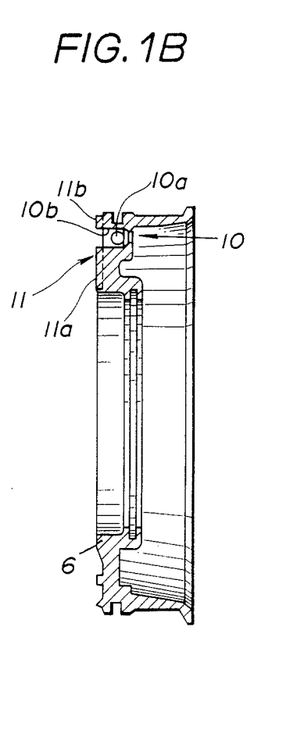

Referring to FIGS. 1A and 1B of the drawings, there is shown a first embodiment of the present invention, which is practically applicable to the afore-mentioned low clutch 1 of FIG. 14.

That is, in this first embodiment, there is arranged near a drain bore 10b of the drain valve 10 a straightening or baffling structure 11 which is exposed to the fluid work chamber 5 of the clutch 1. That is, as is seen from these drawings, the straightening structure 11 comprises aligned longer and shorter vanes 11a and 11b which are arranged to put therebetween a mouth of the drain bore 10b. As is seen from FIG. 1B, the straightening structure 11 is integral with the piston 6.

With the provision of the straightening structure 11, the flow of the fluid toward the drain bore 10b is smoothly carried out without creating the undesired vortex flows about the mouth of the drain bore 10b even when the clutch piston 6 is under rotation. Thus, there is produced no pressure drop at the mouth of the drain bore 10b. Thus, the undesirable phenomena encountered in the afore-mentioned conventional transmission do not occur.

Figure 2A:
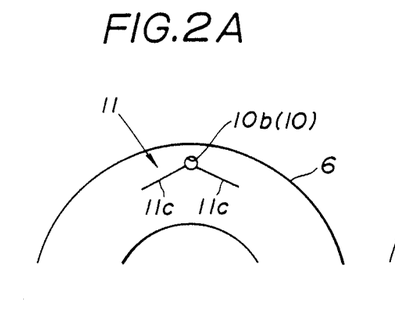
FIGS. 2A to 2G are schematically illustrated front but partial views of clutch pistons, showing modifications of the first embodiment.
Figure 2B:
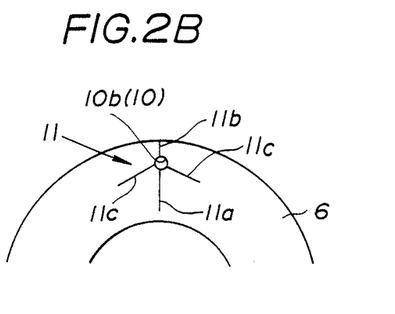
Figure 2C:
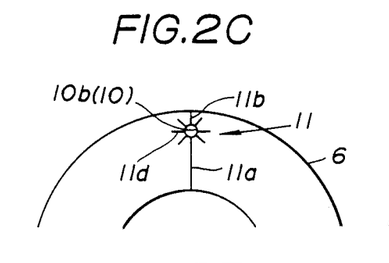
Figure 2D:
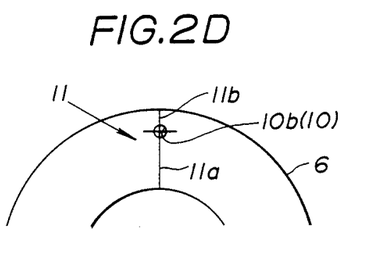
Figure 2E:
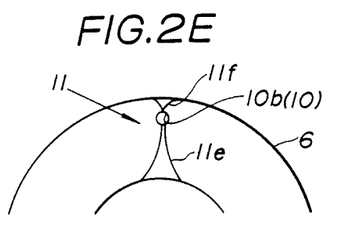
Figure 2F:
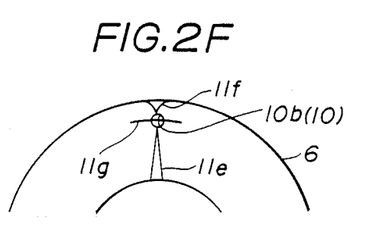
Figure 2G:
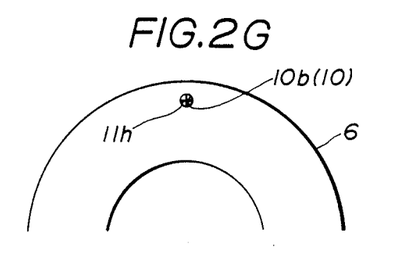

FIGS. 2A to 2G show various modifications of the straightening structure 11. In the modification of FIG. 2A, two vanes 11c of the structure 11 are arranged to intersect at a certain angle. In the modification of FIG. 2B, four vanes 11a, 11b, 11c and 11c are used, which are so arranged as to combine the arrangement of FIG. 1A and that of FIG. 2A. The modification of FIG. 2C comprises straightly aligned longer and shorter vanes 11a and 11b and a plurality of small vanes 11d, which extend radially outwardly from the drain bore 10b of the drain valve 10. In the modification of FIG. 2D, crossed vanes (no numerals) are arranged in such a manner that the intersected portion thereof is placed over the drain bore 10b. In the modifications of FIGS. 2E and 2F, vanes 11e and 11f each having a gradually increased thickness are used, which are arranged at opposite portions with respect to the mouth of the drain bore 10b of the drain valve 10. In these modifications, it is preferable to increase the thickness as the distance from the bore 10b increases. The vanes 11e and 11f of the modification of FIG. 2E have concave sides, as shown. In the modification of FIG. 2F, an arcuate vane 11g is further used, which extends across the mouth of the drain bore 10b of the drain valve 10. In the modification of FIG. 2G, small crossed pieces 11h are detachably plugged in the bore 10b of the drain valve 10. According to these modifications, substantially same function as that of the first embodiment of FIGS. 1A and 1B is achieved.

Figure 3A:
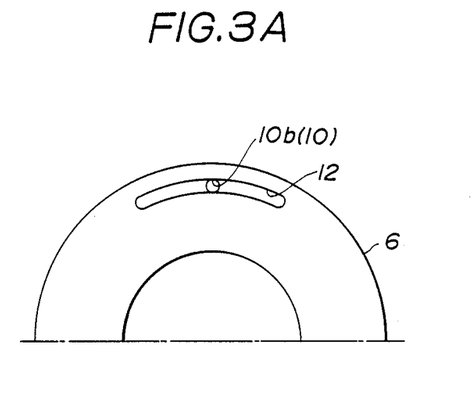
FIGS. 3A and 3B respectively front and sectional, but partial, views of a clutch piston, showing a second embodiment of the present invention.
Figure 3B:
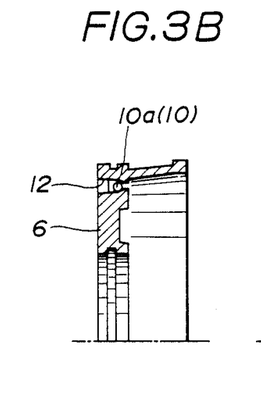

Referring to FIGS. 3A and 3B, there is shown a second embodiment of the present invention. In this embodiment, there is formed in the piston 6 an arcuate groove 12 which extends concentric with the piston 6 and merges with the drain bore 10b at its generally middle part. The groove 12 functions to direct the flows of the fluid toward the drain bore 10b of the drain valve 10, straightening the flows. Thus, the above-mentioned advantages are also achieved in this embodiment.

Figures 4, 5:
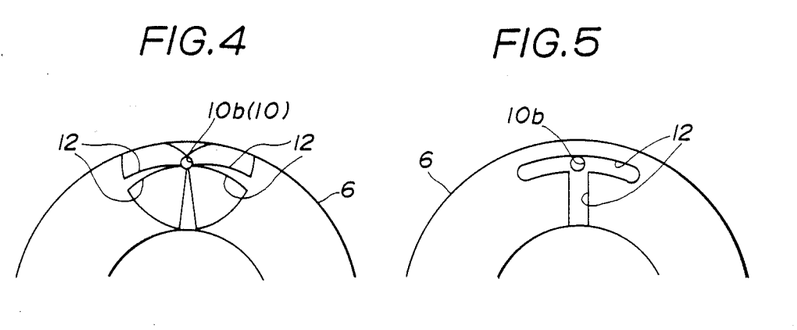
FIGS. 4 and 5 are views similar to FIG. 3A, showing modifications of the second embodiment.

FIGS. 4 and 5 show modifications of the second embodiment. In the modification of FIG. 4, four depressions 12 are formed in the piston 6, which are arranged to form a butterfly-shape, as shown. Each depression is connected with the drain bore 10b at one end thereof. In the modification of FIG. 5, a generally T-shaped groove 12 is employed.

Figures 6A, 6B:
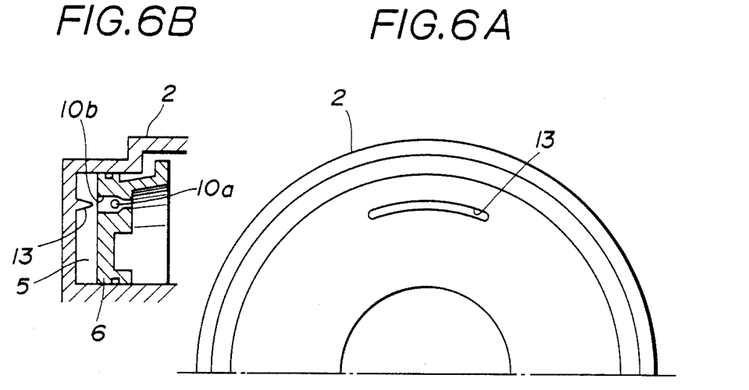
FIGS. 6A and 6B are views similar to FIGS. 3A and 3B respectively, showing a third embodiment of the present invention.

Referring to FIGS. 6A and 6B, there is shown a third embodiment of the present invention. In this embodiment, there is formed on a bottom of the fluid work chamber 5 of the clutch drum 2 an arcuate vane 13 which has a generally middle portion to which the drain bore 10b of the drain valve 10 faces. Because of provision of the vane 13, the flow of fluid directed toward the bore 10b is straightened thereby suppressing formation of undesired vortex flows about the drain bore 10b.

Figures 7A, 7B:
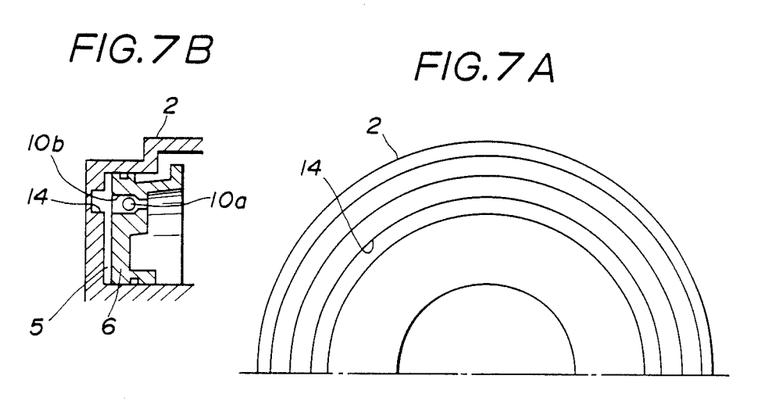
FIGS. 7A and 7B are views similar to FIGS. 3A and 3B respectively, showing a fourth embodiment of the present invention.

Referring to FIGS. 7A and 7B, a fourth embodiment of the present invention is shown. In this embodiment, there is formed in a bottom of the fluid work chamber 5 of the clutch drum 2 an annular groove 14 which is concentric with the piston 6. The groove 14 has a portion to which the drain bore 10b of the drain valve 10 faces. Because of the same reason as that mentioned in the second embodiment of FIGS. 3A and 3B, the flow of the fluid toward the bore 10b is straightened, so that formation of vortex flows about the bore 10b is suppressed.

Figure 8A:
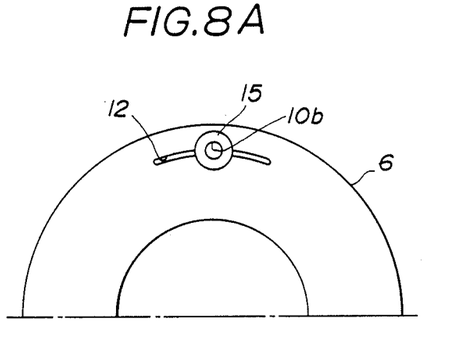
FIGS. 8A and 8B are views similar to FIGS. 3A and 3B respectively, showing a fifth embodiment of the present invention.
Figure 8B:
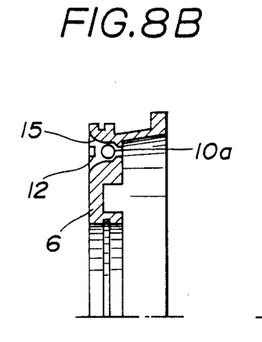

Referring to FIGS. 8A and 8B, there is shown a fifth embodiment of the present invention. This embodiment is a slight modification of the second embodiment of FIGS. 3A and 3B. That is, in the fifth embodiment, the drain bore 10b is gradually increased in section toward the mouth portion 15 thereof. With the provision of the tapered mouth 15, suppression for the vortex flows of the fluid is much more effectively effected.

Figure 9:
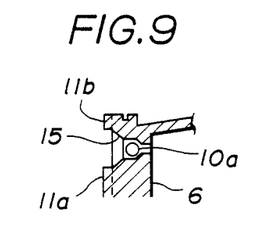
FIG. 9 is a sectional, but partial, view of a clutch piston, showing a modification of the first embodiment of FIGS. 1A and 1B.

FIG. 9 is a modification of the fifth embodiment of FIGS. 8A and 8B. In this embodiment, straightening vanes 11a and 11b are formed on the piston 6.

Figures 10A, 10B:
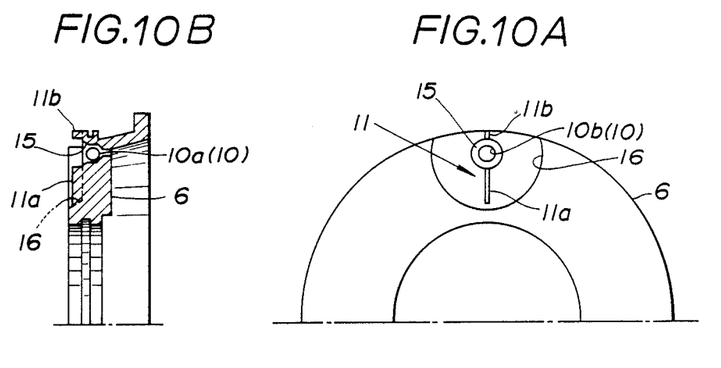
FIGS. 10A and 10B are views similar to FIGS. 3A and 3B respectively, showing a sixth embodiment of the present invention.

Referring to FIGS. 10A and 10B, there is shown a sixth embodiment of the present invention. In this embodiment, a semicircular recess 16 is formed in the piston 6 in a manner to be concentric with the drain bore 10b. The bore 10b is formed with a tapered mouth 15, and longer and shorter vanes 11a and 11b are integrally mounted on a bottom of the recess 16 in a manner to extend radially outwardly from the tapered mouth 15, as shown.

Figure 11:
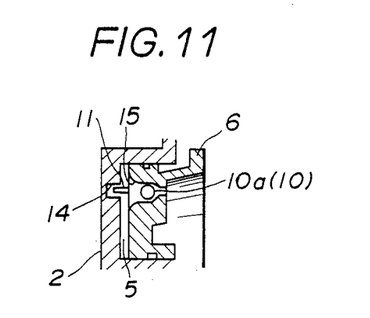
FIG. 11 is a sectional, but partial, view of a clutch piston, showing a seventh embodiment of the present invention.

FIG. 11 shows a seventh embodiment of the present invention. In this embodiment, an arcuate vane 11 is formed on the piston 6, and an arcuate groove 14 is formed in the bottom of the fluid work chamber 5 of the clutch drum 2. As is seen from the drawing, upon contraction of the fluid work chamber 5, the arcuate vane 11 is inserted into the arcuate groove 14.

Figure 12A:
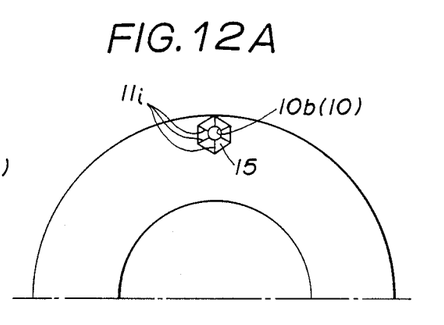
FIG. 12A and 12B are views similar to FIGS. 3A and 3B respectively, showing an eighth embodiment of the present invention.
Figure 12B:
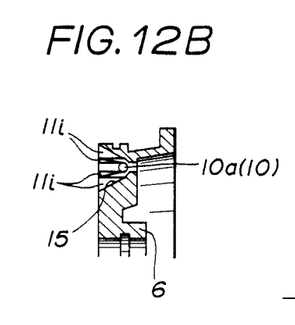

Referring to FIGS. 12A and 12B, there is shown an eighth embodiment of the present invention. In this embodiment, the mouth portion 15 of the drained bore 10b is shaped like a hexagonal pyramid and six straightening vanes 11i are mounted on respective ridgelines of the pyramid mouth portion 15 to extend along the same.

Figure 13:
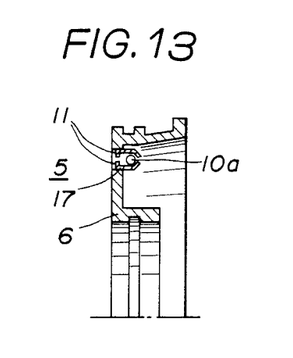
FIG. 13 is a sectional, but partial, view of a clutch piston, showing a ninth embodiment of the present invention.

FIG. 13 shows a ninth embodiment of the present invention. In this embodiment, a drain valve unit 17 including a housing (no numeral) and a valve ball 10a is disposed in a bore (no numeral) formed in the piston 6. The housing is formed at its one end with straightening vanes 11. Upon assembly, the unit 17 is placed apart from the fluid work chamber 5 as remote as possible in order to lessen the effect of vortex flow of fluid applied thereto.

As is understood from the foregoing description, in accordance with the present invention, there is provided a so-called flow straightening means at a position near the mouth of the drain bore of the drain valve. Thus, the flow of the fluid toward the drain bore is smoothly carried out without creating undesired vortex flows in the fluid work chamber even when the clutch piston 6 is under rotation. Thus, the undesired sharp pressure drop is not produced near the mouth of the drain bore in the fluid work chamber. This solves the undesirable phenomena which have been encountered in the afore-mentioned conventional transmission.

What is claimed is:

1. In an automatic transmission having a clutch drum, a planetary gear unit and a clutch mechanism which selectively engages said clutch drum and said planetary gear unit,
   a hydraulic actuator for actuating said clutch mechanism by using a hydraulic pressure, which comprises:
   a means defining a chamber defined said clutch drum;
   a piston operatively disposed in said chamber to form a fluid work chamber, said piston actuating said clutch mechanism when said fluid work chamber is filled with a pressurized fluid;
   a drain valve including a drain bore formed in the piston having one end exposed to said fluid work chamber and a valve ball movably interposed in said drain bore in such a manner that when said fluid work chamber is filled with a pressurized fluid, said ball closes said drain bore; and
   flow straightening means for straightening flow of the fluid toward said drain bore in order to suppress formation of vortex flow of the fluid in said fluid work chamber about a mouth of said drain bore, said flow straightening means being a structure which is exposed to said fluid work chamber near the mouth of said drain bore, said structure including vanes which are integrally formed on said piston in a manner to extend radially outwardly from said drain bore of said drain valve relative to an axis of said drain bore.

2. A hydraulic actuator as claimed in claim 1, in which said flow straightening means comprises:
   a semicircular recess formed in said piston in a manner to be concentric with said mouth of said drain bore, said mouth being tapered; and
   vanes integrally mounted on a bottom of said semicircular recess and extending radially outwardly from the tapered mouth of said drain bore.

3. A hydraulic actuator as claimed in claim 1, in which said flow straightening means comprises:
   said mouth defining a hexagonal pyramid mouth in said drain bore; and
   six said vanes mounted on respective ridgelines of the pyramid mouth in a manner to extend along the same.

4. A hydraulic actuator as claimed in claim 1, in which said vanes have different lengths.

5. A hydraulic actuator as claimed in claim 4, in which said vanes are crossed to each other and in which the crossed vanes are arranged in such a manner that the intersected portion thereof is placed over the mouth of the drain bore.

6. A hydraulic actuator as claimed in claim 4, in which each of the vanes is gradually increased in thickness as the distance from said mouth of the drain bore increases.

7. A hydraulic actuator as claimed in claim 6, further comprising an arcuate vane which extends across said mount of said drain bore.

* * * * *